(12) United States Patent
Barel

(10) Patent No.: US 9,740,312 B2
(45) Date of Patent: Aug. 22, 2017

(54) PRESSURE SENSITIVE STYLUS

(71) Applicant: Microsoft Technology Licensing, LLC, Redmond, WA (US)

(72) Inventor: Eliyahu Barel, Beit-Aryeh (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/848,527

(22) Filed: Sep. 9, 2015

(65) Prior Publication Data

US 2017/0068345 A1    Mar. 9, 2017

(51) Int. Cl.
| | |
|---|---|
| *G06F 3/0354* | (2013.01) |
| *G06F 3/0338* | (2013.01) |
| *G06F 3/0346* | (2013.01) |
| *G06F 3/044* | (2006.01) |
| *G06F 3/045* | (2006.01) |

(52) U.S. Cl.
CPC ........ *G06F 3/03545* (2013.01); *G06F 3/0338* (2013.01); *G06F 3/0346* (2013.01); *G06F 3/044* (2013.01); *G06F 3/045* (2013.01)

(58) Field of Classification Search
CPC .. G06F 3/03545; G06F 3/0338; G06F 3/0346; G06F 3/044; G06F 3/045
See application file for complete search history.

(56) References Cited

U.S. PATENT DOCUMENTS

| | | | |
|---|---|---|---|
| 4,111,052 A | 9/1978 | Sniderman | |
| 4,451,698 A | 5/1984 | Whetstone et al. | |
| 4,672,154 A | 6/1987 | Rodgers et al. | |
| 5,004,872 A | 4/1991 | Lasley | |
| 5,138,118 A | 8/1992 | Russell | |
| 5,225,637 A | 7/1993 | Rodgers et al. | |
| 5,414,227 A | 5/1995 | Schubert et al. | |
| 5,528,002 A | 6/1996 | Katabami | |
| 5,565,632 A | 10/1996 | Ogawa | |
| 5,571,997 A | 11/1996 | Gray et al. | |
| 5,576,502 A | 11/1996 | Fukushima et al. | |
| 5,581,052 A | 12/1996 | Padula et al. | |
| 5,793,360 A | 8/1998 | Fleck et al. | |
| 5,914,708 A | 6/1999 | LaGrange et al. | |
| 6,104,388 A | 8/2000 | Nagai et al. | |
| 6,175,773 B1 | 1/2001 | Reiffel et al. | |
| 6,211,863 B1 | 4/2001 | Chery et al. | |
| 6,232,962 B1 | 5/2001 | Davis et al. | |
| 6,249,234 B1 | 6/2001 | Ely et al. | |

(Continued)

FOREIGN PATENT DOCUMENTS

| | | |
|---|---|---|
| EP | 0209467 | 1/1987 |
| EP | 2818981 | 12/2004 |

(Continued)

OTHER PUBLICATIONS

Official Action Dated May 5, 2016 From the US Patent and Trademark Office Re. U.S. Appl. No. 14/395,837.

(Continued)

*Primary Examiner* — Charles Hicks

(57) ABSTRACT

A stylus includes a housing that extends along a longitudinal direction and includes an opening on one end, a tip that extends along the longitudinal direction and through the opening and a sensor configured to detect displacement of the tip in a direction perpendicular to the longitudinal direction.

22 Claims, 11 Drawing Sheets

(56) References Cited

U.S. PATENT DOCUMENTS

| | | | |
|---|---|---|---|
| 6,344,656 B1 | 2/2002 | Hopkins et al. | |
| 6,474,888 B1 | 11/2002 | Lapstun et al. | |
| 6,624,832 B1 | 9/2003 | Thomas | |
| 6,690,156 B1 | 2/2004 | Weiner et al. | |
| 6,707,451 B1 | 3/2004 | Nagaoka | |
| 6,727,439 B2 | 4/2004 | Chao et al. | |
| 6,853,369 B2 | 2/2005 | Fukushima et al. | |
| 6,972,754 B2 | 12/2005 | Zank | |
| 7,145,555 B2 | 12/2006 | Taylor et al. | |
| 7,202,862 B1 | 4/2007 | Palay et al. | |
| 7,210,046 B2 | 4/2007 | Truong | |
| 7,279,646 B2 | 10/2007 | Xu | |
| 7,292,229 B2 | 11/2007 | Morag et al. | |
| 7,367,242 B2 | 5/2008 | Xi et al. | |
| 7,372,455 B2 | 5/2008 | Perski et al. | |
| 7,436,397 B2 | 10/2008 | Zank | |
| 7,778,795 B2 | 8/2010 | Fukushima et al. | |
| 7,843,439 B2 | 11/2010 | Perski et al. | |
| 7,955,017 B2 | 6/2011 | Lapstun et al. | |
| 8,199,132 B1 | 6/2012 | Oda et al. | |
| 8,212,795 B2 | 7/2012 | Henry | |
| 8,228,299 B1 | 7/2012 | Maloney et al. | |
| 8,481,872 B2 | 7/2013 | Zachut | |
| 8,536,471 B2 | 9/2013 | Stern et al. | |
| 8,629,358 B2 | 1/2014 | Rimon et al. | |
| 8,686,964 B2 | 4/2014 | Rimon | |
| 8,780,089 B2 | 7/2014 | Yuan et al. | |
| 8,878,823 B1 | 11/2014 | Kremin et al. | |
| 9,063,591 B2 | 6/2015 | Alameh et al. | |
| 9,116,558 B2 | 8/2015 | Yilmaz et al. | |
| 9,122,322 B2 | 9/2015 | Stern et al. | |
| 9,158,393 B2 | 10/2015 | Vlasov | |
| 9,218,073 B1 | 12/2015 | Kremin et al. | |
| 2002/0040817 A1 | 4/2002 | LeKuch et al. | |
| 2004/0001052 A1 | 1/2004 | Zank | |
| 2005/0110777 A1 | 5/2005 | Geaghan et al. | |
| 2005/0166076 A1 | 7/2005 | Truong | |
| 2005/0195387 A1 | 9/2005 | Zhang et al. | |
| 2006/0068851 A1 | 3/2006 | Ashman, Jr. | |
| 2006/0109252 A1 | 5/2006 | Kolmykov-Zotov et al. | |
| 2006/0267966 A1 | 11/2006 | Grossman et al. | |
| 2007/0014490 A1 | 1/2007 | Silverbrook et al. | |
| 2007/0085836 A1 | 4/2007 | Ely | |
| 2007/0146351 A1 | 6/2007 | Katsurahira et al. | |
| 2007/0176909 A1 | 8/2007 | Pavlowski | |
| 2008/0128180 A1 | 6/2008 | Perski et al. | |
| 2009/0078476 A1 | 3/2009 | Rimon et al. | |
| 2009/0114459 A1* | 5/2009 | Fukushima | G06F 3/03545 178/19.03 |
| 2009/0122029 A1 | 5/2009 | Sin | |
| 2009/0262637 A1 | 10/2009 | Badaye et al. | |
| 2009/0289922 A1 | 11/2009 | Henry | |
| 2010/0006350 A1 | 1/2010 | Elias | |
| 2010/0051356 A1 | 3/2010 | Stern et al. | |
| 2010/0084203 A1 | 4/2010 | Peng | |
| 2010/0107770 A1 | 5/2010 | Serban et al. | |
| 2010/0155153 A1 | 6/2010 | Zachut | |
| 2010/0214252 A1 | 8/2010 | Wu | |
| 2011/0090146 A1 | 4/2011 | Katsurahira | |
| 2012/0050231 A1 | 3/2012 | Westhues et al. | |
| 2012/0228039 A1 | 9/2012 | Hinson et al. | |
| 2012/0253699 A1 | 10/2012 | Kuno | |
| 2012/0327040 A1 | 12/2012 | Simon et al. | |
| 2013/0141398 A1 | 6/2013 | Cho et al. | |
| 2013/0265265 A1 | 10/2013 | Stern | |
| 2013/0321355 A1 | 12/2013 | Teiblum | |
| 2014/0002422 A1 | 1/2014 | Stern et al. | |
| 2014/0019070 A1 | 1/2014 | Dietz et al. | |
| 2014/0132529 A1 | 5/2014 | Jeong | |
| 2014/0210781 A1 | 7/2014 | Stern | |
| 2014/0218343 A1* | 8/2014 | Hicks | G06F 3/033 345/179 |
| 2015/0054757 A1* | 2/2015 | Kuroda | G06F 3/03545 345/173 |
| 2015/0070316 A1 | 3/2015 | Oda et al. | |
| 2015/0070330 A1 | 3/2015 | Stern | |
| 2015/0116289 A1 | 4/2015 | Stern et al. | |
| 2015/0370354 A1 | 12/2015 | Stern et al. | |
| 2016/0124530 A1 | 5/2016 | Stern | |
| 2016/0231833 A1* | 8/2016 | Gu | G06F 3/03545 |
| 2017/0045961 A1 | 2/2017 | Stern | |
| 2017/0045962 A1 | 2/2017 | Stern et al. | |

FOREIGN PATENT DOCUMENTS

| | | |
|---|---|---|
| EP | 2187288 | 5/2010 |
| EP | 2204724 | 7/2010 |
| EP | 2339432 | 6/2011 |
| EP | 1349056 | 7/2011 |
| EP | 2650758 | 10/2013 |
| JP | 6-119101 | 4/1994 |
| JP | 03-327056 | 9/2002 |
| WO | WO 01/24157 | 4/2001 |
| WO | WO 02/41129 | 5/2002 |
| WO | WO 2009/143046 | 11/2009 |
| WO | WO 2010/086035 | 8/2010 |
| WO | WO 2012/123951 | 9/2012 |
| WO | WO 2013/160887 | 10/2013 |
| WO | WO 2014/043239 | 3/2014 |
| WO | WO 2015/027017 | 2/2015 |
| WO | WO 2016/020818 | 2/2016 |

OTHER PUBLICATIONS

Official Action Dated May 6, 2016 From the US Patent and Trademark Office Re. U.S. Appl. No. 14/451,448.

Notice of Allowance Dated Jul. 29, 2016 From the US Patent and Trademark Office Re. U.S. Appl. No. 14/839,985.

Advisory Action Before the Filing of an Appeal Brief Dated Sep. 15, 2016 From the US Patent and Trademark Office Re. U.S. Appl. No. 14/395,837.

Written Opinion Dated Sep. 2, 2016 From the International Preliminary Examining Authority Re. Application No. PCT/IB2015/055863.

International Preliminary Report on Patentability Dated Oct. 19, 2016 From the International Preliminary Examining Authority Re. Application No. PCT/IB2015/055863.

Communication Relating to the Results of the Partial International Search Dated Oct. 13, 2015 From the International Searching Authority Re. Application No. PCT/IB2015/055863.

Communication Relating to the Results of the Partial International Search Dated Jul. 25, 2012 From the International Searching Authority Re. Application No. PCT/IL2012/050095.

International Preliminary Report on Patentability Dated Nov. 6, 2014 From the International Bureau of WIPO Re. Application No. PCT/IL2012/050143.

International Preliminary Report on Patentability Dated Sep. 26, 2013 From the International Bureau of WIPO Re. Application No. PCT/IL2012/050095.

International Search Report and the Written Opinion Dated Mar. 6, 2014 From the International Searching Authority Re. Application No. PCT/IL2013/050836.

International Search Report and the Written Opinion Dated Sep. 7, 2012 From the International Searching Authority Re. Application No. PCT/IL2012/050095.

International Search Report and the Written Opinion Dated Jan. 16, 2013 From the International Searching Authority Re. Application No. PCT/IL2012/050143.

International Search Report and the Written Opinion Dated Jan. 26, 2016 From the International Searching Authority Re. Application No. PCT/IB2015/055863.

Notice of Allowance Dated Feb. 3, 2015 From the US Patent and Trademark Office Re. U.S. Appl. No. 13/908,063.

Notice of Allowance Dated Mar. 22, 2013 From the US Patent and Trademark Office Re. U.S. Appl. No. 12/546,753.

Notice of Allowance Dated Apr. 24, 2015 From the US Patent and Trademark Office Re. U.S. Appl. No. 14/005,308.

Official Action Dated Jul. 3, 2012 From the US Patent and Trademark Office Re. U.S. Appl. No. 12/546,753.

(56) References Cited

OTHER PUBLICATIONS

Official Action Dated Jun. 3, 2014 From the US Patent and Trademark Office Re. U.S. Appl. No. 13/908,063.
Official Action Dated Oct. 8, 2015 From the US Patent and Trademark Office Re. U.S. Appl. No. 14/395,837.
Official Action Dated Dec. 19, 2013 From the US Patent and Trademark Office Re. U.S. Appl. No. 13/908,063.
Official Action Dated Oct. 19, 2012 From the US Patent and Trademark Office Re. U.S. Appl. No. 12/546,753.
Official Action Dated Oct. 21, 2015 From the US Patent and Trademark Office Re. U.S. Appl. No. 14/451,448.
Official Action Dated Feb. 22, 2016 From the US Patent and Trademark Office Re. U.S. Appl. No. 14/839,985.
Official Action Dated Nov. 25, 2014 From the US Patent and Trademark Office Re. U.S. Appl. No. 14/005,308.
Official Action Dated Jan. 31, 2012 From the US Patent and Trademark Office Re. U.S. Appl. No. 12/546,753.
Supplemental Notice of Allowability Dated May 8, 2013 From the US Patent and Trademark Office Re. U.S. Appl. No. 12/546,753.
Hoffman "Not All Tablet Styluses Are Equal: Capacity, Wacom, and Bluetooth Explained", How-to-Geek, 4 P., Sep. 12, 2013.
IBM "Automatic Switching Stylus for Pen-Based Computer Systems", IBM Technical Disclosure Bulletin, XP000419075, 36(12): 583-584, Dec. 1, 1993.
Jones "Stylus Reviews: TrueGlide Apex Review". iPad for Artists. 4 P., Nov. 21, 2013.
Song et al. "Grips and Gestures on a Multi-Touch Pen", Proceedings of the SIGCHI Conference on Human Factors in Computing Systems, CHI'11, Session: Flexible Grips & Gestures, Vancouver, BC, Canada, May 7-12, 2011, p. 1323-1332, May 2011.
Invitation to Pay Additional Fees Dated May 31, 2016 From the International Preliminary Examining Authority Re. Application No. PCT/IB2015/055863.
Official Action Dated Jan. 20, 2017 From the US Patent and Trademark Office Re. U.S. Appl. No. 15/335,517. (15 pages).
Official Action Dated Mar. 24, 2017 From the US Patent and Trademark Office Re. U.S. Appl. No. 14/702,726. (48 pages).
Official Action Dated Apr. 12, 2017 From the US Patent and Trademark Office Re. U.S. Appl. No. 15/338,549. (43 pages).
Official Action Dated Apr. 14, 2017 From the US Patent and Trademark Office Re. U.S. Appl. No. 14/930,815. (44 pages).
Restriction Official Action Dated Mar. 1, 2017 From the US Patent and Trademark Office Re. U.S. Appl. No. 14/930,815. (5 pages).
Restriction Official Action Dated Feb. 17, 2017 From the US Patent and Trademark Office Re. U.S. Appl. No. 14/702,726. (6 pages).
International Search Report and the Written Opinion Dated Nov. 21, 2016 From the International Searching Authority Re. Application No. PCT/US2016/045661. (13 Pages).

* cited by examiner

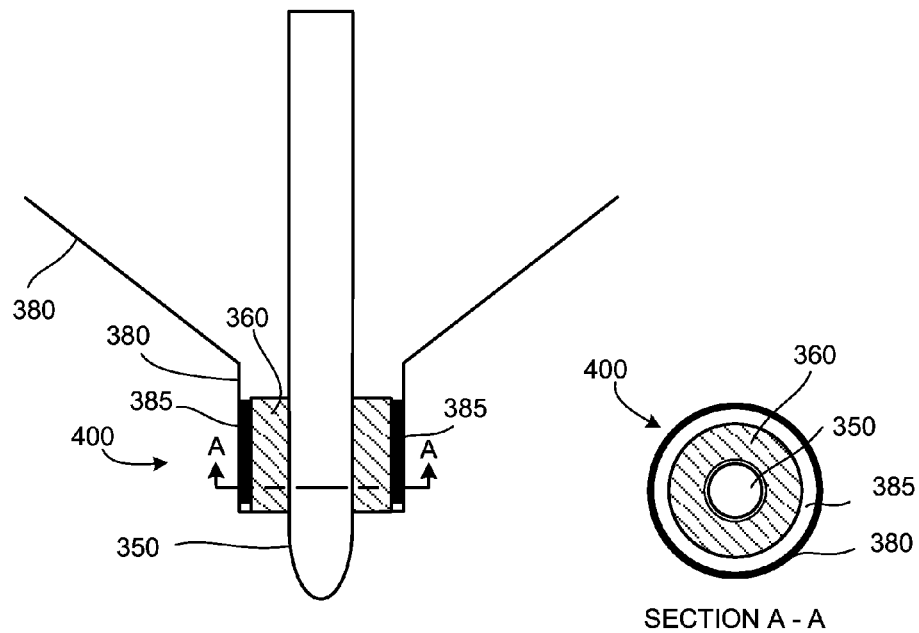
FIG. 3A  FIG. 3B
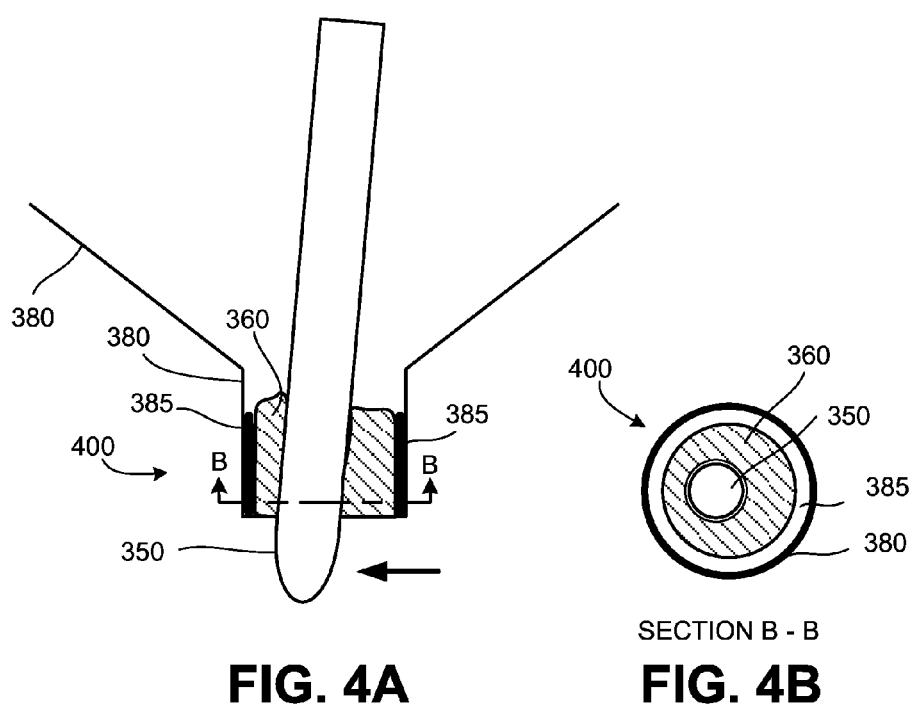
FIG. 4A  FIG. 4B

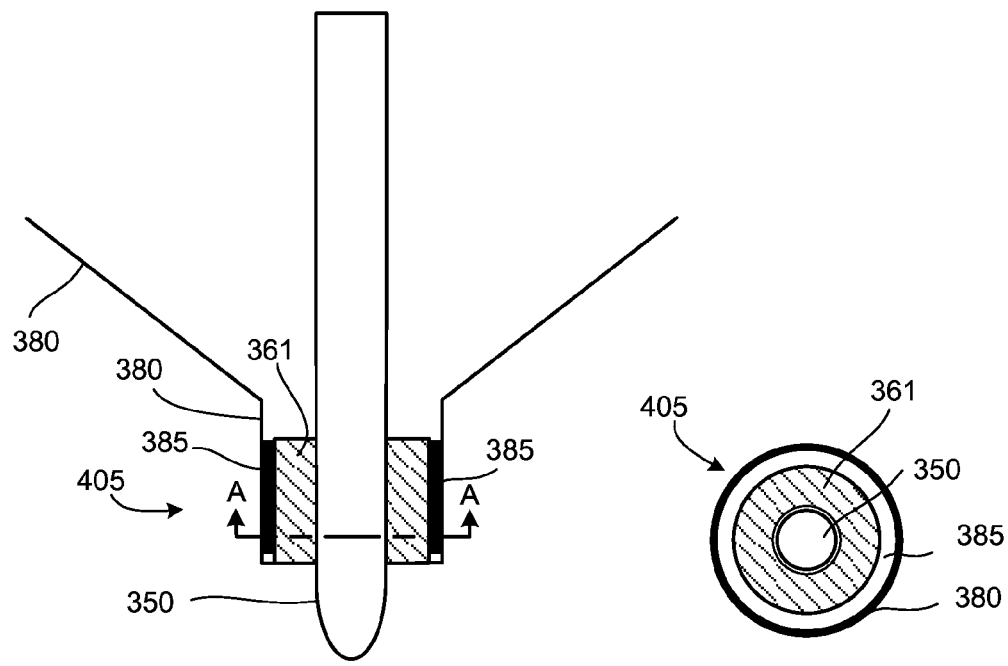
FIG. 6A  FIG. 6B
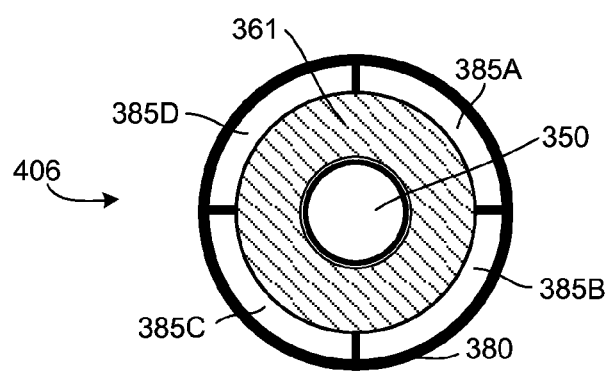
FIG. 7

PRESSURE SENSITIVE STYLUS

BACKGROUND

Digitizer systems are used as computer input devices for capturing data or handwritten signatures, text, drawings, symbols and the like. Digitizing tablets and touch screens are exemplary digitizer systems used to replace a mouse as a primary pointing and navigation device for desktop computers. A user interacts with the digitizer system by positioning and moving an object such as stylus and/or a finger over a sensing surface of the system, e.g. a tablet and/or a touch screen. Position of the object with respect to the sensing surface is tracked by the digitizer system and interpreted as a user command.

SUMMARY

Users are typically known to hold a stylus at an angle, e.g. 30. degree angle while interacting with a sensing surface of a computing device. During interaction, force is applied in both the axial direction and the cross axial of the writing tip due to contact pressure with the sensing surface. Force in the axial direction leads to retraction of the writing tip while the force in the cross-axial direction leads to bending of the writing tip. The cross-axial forces are typically significant and may be larger than the axial forces. According to some embodiments of the present disclosure, there is provided a stylus that is sensitive to cross axial forces applied on the writing tip.

Typically, the stylus is also sensitive to axial forces applied on the writing tip.

According to some embodiments of the present disclosure, there is provided a sensor for sensing cross axial forces applied on the writing tip.

Unless otherwise defined, all technical and/or scientific terms used herein have the same meaning as commonly understood by one of ordinary skill in the art.

Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIGS. 3A and 3B are simplified schematic cross sectional views of an exemplary writing tip with capacitive based sensor in a neutral position, the cross sectional views cut along a length and diameter respectively in accordance with some embodiments of the present disclosure;

FIGS. 4A and 4B are simplified schematic cross sectional views of an exemplary writing tip with capacitive based sensor in a tilted position, the cross sectional views cut along a length and diameter in accordance with some embodiments of the present disclosure;

FIGS. 6A and 6B are simplified schematic cross sectional views of an exemplary writing tip with resistive based sensor in a neutral position, the cross sectional views cut along a length and diameter respectively in accordance with some embodiments of the present disclosure;

FIG. 7 is a simplified schematic cross sectional view cut across a diameter of a writing tip and a resistive based sensor in accordance with some embodiments of the present disclosure;

DETAILED DESCRIPTION

Figure 1A:
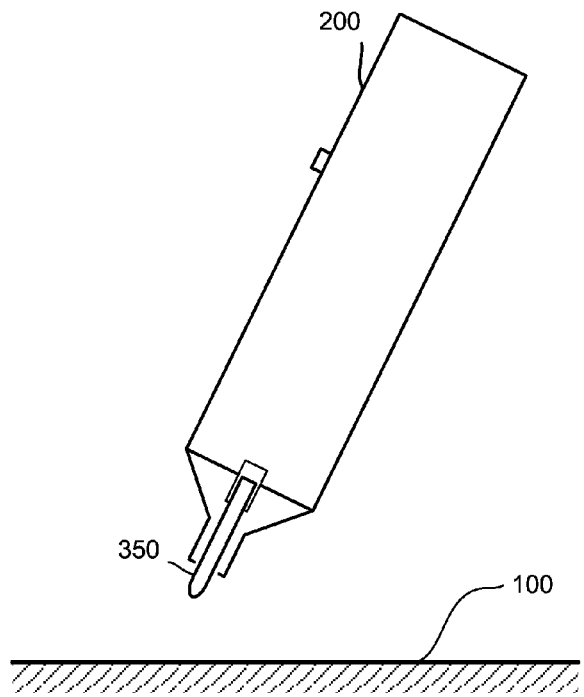
FIGS. 1A and 1B are simplified schematic drawings of an exemplary stylus in a hover and touch operation mode in accordance with some embodiments of the present disclosure.

A stylus for interacting with the digitizer sensor can be a passive conductive object or a pointing device that transmits a signal. An electromagnetic stylus is one type of stylus known in the art for operating a digitizer system. The electromagnetic stylus operates by emitting an electromagnetic signal that can be picked up at locations on the sensing surface of the system. Position detection of a writing tip of the stylus can typically be performed while the object is either touching or hovering over the sensing surface. The writing tip is often associated with a sensor that senses an axial force applied on the writing tip due to contact pressure.

According to some embodiments of the present disclosure, a stylus includes a sensor that is sensitive to tilting or bending of the writing tip. The writing tip tends to bend or tilt when a user presses the writing tip against a sensing surface. Typically, the bending or tilting is a result of the typically elongated shape and elastic properties of the writing tip. According to some embodiments of the present disclosure, the sensor includes compressible material that compresses in response to tilting or bending of the writing tip. In some embodiments, the compressible material surrounds the writing tip. Compression of the material leads to a detectable change in the output of the sensor. The sensor can be a capacitive based sensor or a resistive based sensor. For a capacitive based sensor, a compressible dielectric ring is positioned around a conductive writing tip. The dielectric ring fills a space between the tip and a conductive portion, e.g. conductive ring integrated or patterned on the stylus housing. Capacitance between the tip and the conductive ring on the stylus housing is monitored. Bending or tilting of the writing tip compresses the dielectric ring and as a result the capacitance changes. Optionally, a plurality of discrete electrodes is patterned on the stylus housing in place of the conductive ring. Capacitance between the tip and each of the discrete electrodes can be monitored so that a direction as well as magnitude of tilt can be detected. For a resistive sensor, the compressible material varies its conductive properties in response to compression. Optionally, the sensor can include a compressible dielectric/conductive ring that alters its resistivity or become conductive in response to compression. Bending or tilting of the writing tip compresses the dielectric/conductive ring and alters amplitude of a signal detected on the conductive ring. Compression due to bending or tilting also may lead to a phase shift in the signal detected on the conductive ring. The signal detected is a signal transmitted on the writing tip.

In other embodiments, the compressible material included in the capacitive or resistive based sensor communicates with a distal end of the writing tip (distal from the end that interacts with the sensing surface) and does not necessarily surround the tip. Alternatively, compressible dielectric/conductive material is applied directly on the tip and pressure applied on the writing tip is detected based on amplitude of signals detected along a length of the writing tip.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings. The disclosure is capable of other embodiments or of being practiced or carried out in various ways.

Figure 1B:
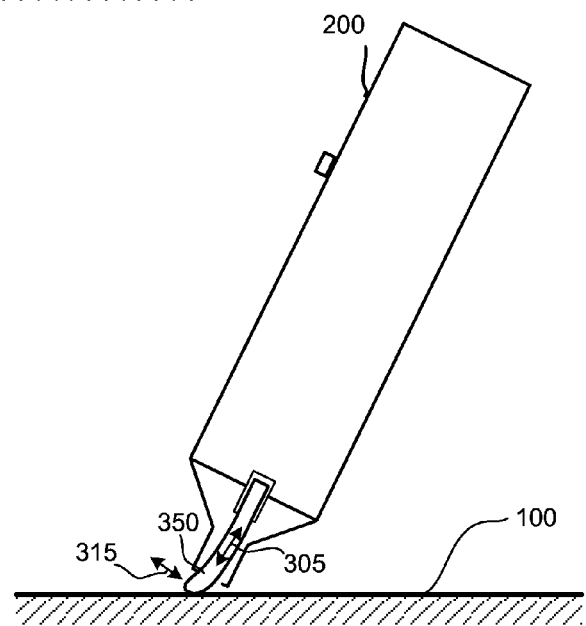

Reference is now made to FIGS. 1A and 1B showing a simplified schematic drawing of an exemplary stylus in a hover and touch operation mode in accordance with some embodiments of the present disclosure. Stylus 200 interacts with a digitizer sensor 100 by hovering over digitizer sensor 100 (FIG. 1A) and also by touching digitizer sensor 100 (FIG. 1B). Typically, a user holds stylus 200 at an angle with digitizer sensor 100 during interaction. While stylus 200 touches digitizer sensor 100, a writing tip 350 of stylus 200 is pressed against a surface of digitizer sensor 100. Contact with digitizer sensor 100 or other surface while stylus 200 is held at an angle exerts force on writing tip 350 in both an axial direction 305 and a cross-axial direction 315. The axial direction is also the longitudinal direction of stylus 200. Writing tip 350 typically bends or tilts over a range of 0-500 μm due to an applied cross axial force and typically retracts into stylus 200 over a distance ranging between 0-150 μm or up to 200 μm. In some exemplary embodiments, bending/tilting and retraction of writing tip 350 is monitored during interaction with digitizer sensor 100.

Optionally, information regarding bending/tilting and retraction of writing tip 350 is transmitted by stylus 200 and picked up by digitizer sensor 100. Typically, detection of bending and tilt improves the accuracy for detecting a transition between hover and touch. Typically, detection of bending and tilt also improves the accuracy for detecting variation in pressure applied during touch. Optionally, writing tip 350 is not retractable or retraction of writing tip 350 is not sensed.

Figure 2:
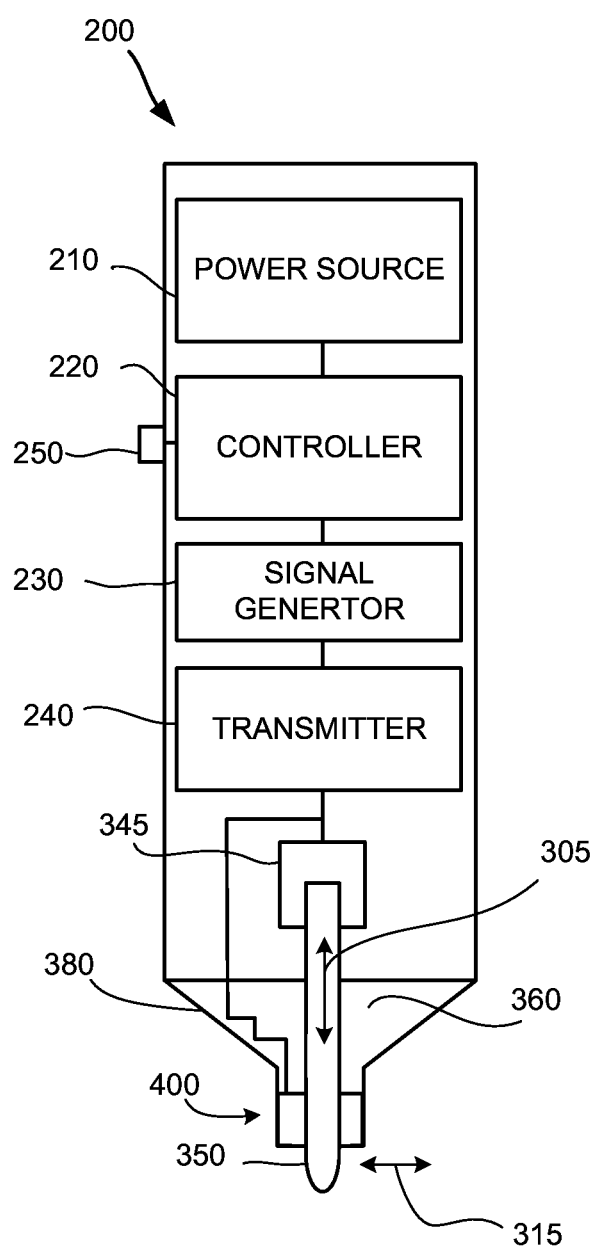
FIG. 2 is a simplified block diagram of an exemplary stylus with an exemplary pressure sensor in accordance with some embodiments of the present disclosure.

Reference is now made to FIG. 2 showing a simplified block diagram of an exemplary stylus with an exemplary pressure sensor in accordance with some embodiments of the present disclosure. Stylus 200 can be an active stylus that self-generates a transmitting signal with or without receiving a triggering signal from a digitizer system or from another source. Stylus 200 can alternatively be a passive stylus that includes a resonator arrangement that is activated in response to receiving the trigger signal. Stylus 200 typically includes a transmitter 240 that transmits a signal that can be picked up by a digitizer sensor. The signal is typically transmitted at or near its writing tip 350, so that a position of writing tip can be detected and tracked with the digitizer sensor. Optionally, writing tip 350 operates as an antenna.

For an active stylus, the signal is generated by signal generator 230 and powered by power source 210. Power source can include for example, one or more batteries and/or a super capacitor. The signal transmitted by stylus 200 can be formed from signal bursts, e.g. AC signal bursts transmitted at a pre-defined frequency or pattern. The signal bursts may be a modulated signal that includes encoded information regarding an operational state of the stylus 200. Optionally, the AC pulses have a frequency content selected between 20 KHz and 2 MHz. In some exemplary embodiments, transmitter 240 additionally includes reception ability to provide two way communication, e.g. with a digitizer system.

According to some embodiments of the present disclosure, stylus 200 includes a tip pressure sensor 400 that surrounds writing tip 350 and detects when pressure is applied on writing tip 350, e.g. during interaction with a digitizer sensor. A user typically holds stylus 200 at an angle of about 20°-40°, e.g. 30 while interacting with a sensing surface of a digitizer. The force applied on writing tip 350 while stylus is held at an angle is both in an axial direction 305 and in a cross-axial direction 315. Force in cross-axial direction 315 tends to displace writing tip 350 with respect to housing 380 due to slight bend or tilt of writing tip 350. Force in axial direction 305 typically leads to slight retraction of writing tip 350 into housing 380. According to some embodiments of the present disclosure, pressure sensor 400 is sensitive to bending or tilting of writing tip 350 and detects contact pressure applied on writing tip 350 based on the sensed bending or tilting. Optionally, stylus 200 additionally includes pressure sensor 345 dedicated to detecting retraction of writing tip 350 or force exerted in axial direction 305 due to contact pressure.

Depending on the angle of stylus 200 during interaction with a sensing surface, writing tip 350 may begin to bend or tilt before retracting in axial direction 305. Detecting force in cross-axial direction 315 may improve sensitivity in detecting when writing tip 350 first touches a sensing surface, e.g. transition between a hovering and touch state of writing tip 350. Optionally, detecting both cross axial and axial force improves overall sensitivity of stylus 200 to contact pressure. In some exemplary embodiments, outputs from sensor 400 and sensor 345 are encoded on the signal generated by signal generator 230.

According to some embodiments of the present disclosure, controller 110 controls operation of stylus 200. In some exemplary embodiments, controller 110 additionally provides processing and memory capability. In some exemplary embodiments, outputs from sensor 400 and sensor 345 are processed and optionally stored in controller 110. Stylus 200 may also include one or more user controlled buttons 250 that allow a user to select an operational mode. Optionally, a state of button 250 is processed and optionally stored in controller 110. Optionally, controller 110 controls encoding a state of button 250 on the signal generated by signal generator 230. Typically, power source 210, controller 220, signal generator 230, transmitter 240 are housed in housing 380 while writing tip 350 and user controlled buttons 250 extend out from housing 380.

Reference is now made to FIGS. 3A, 3B, 4A and 4B showing simplified schematic cross sectional views of an exemplary writing tip with sensor in a neutral position and FIGS. 4A and 4B showing the exemplary writing tip with sensor in a tilted position, the cross sectional views cut along a length and diameter respectively in accordance with some embodiments of the present disclosure. According to some embodiments of the present disclosure, sensor 400 is a capacitive type sensor including compressible material 360 positioned between a conductive writing tip 350 and a circumferential electrode 385 surrounding tip 350. Typically, compressible material 360 is ring shaped. Optionally, tip 350 has a diameter of between 0.7-1.2 mm and compressible material 360 surrounds tip 350 with an outer diameter of between 1-2 mm and an inner diameter that matches diameter of tip 350. Optionally, thickness of the compressible ring in the radial direction is 0.1 mm or more, e.g. between 0.1 mm-1 mm. Circumferential electrode 385 can be a conductive ring that is integrated as part of housing 380 or an electrode patterned on an inner surface of housing 380.

Typically, each of writing tip 350 and electrode 385 is in electrical communication with circuitry of stylus 200, e.g. controller 220. For a capacitive based sensor, compressible material 360 is selected to be a dielectric material. Optionally, elastic polymer such as silicone rubber is used for the dielectric material. Optionally, the material is selected to have hardness in a range of Shore A 20-50. Writing tip 350 operates as one electrode of the capacitor and electrode 385 operates as the other electrode of the capacitor. A signal transmitted on writing tip 350 can be picked up on electrode 385 due to capacitive coupling formed between writing tip 350 and electrode 385.

In some exemplary embodiments, compressible material 360 compresses due to bending or tilting of tip 350. As writing tip 350 approaches electrode 385 due to tilting or bending, the capacitance increases and amplitude of the signal picked up on electrode 385 increases. Likewise, as writing tip 350 returns to its neutral position, amplitude of the signal picked up on electrode 385 decreases. Optionally, the compressible material is selected to have resilient properties so that writing tip 350 is urged back to its neutral position once contact pressure on writing tip is released. In some exemplary embodiments, output from electrode 385 is sampled and processed by circuitry of stylus 200, e.g. controller 220 (FIG. 2). Optionally, amplitude level is translated to pressure levels applied on writing tip 350.

Figure 5A:
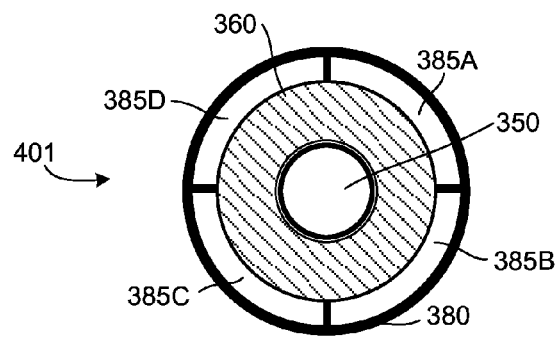
FIGS. 5A, 5B and 5C are simplified schematic cross sectional views cut along a diameter of a writing tip and a capacitive based sensor in accordance with some embodiments of the present disclosure.
Figure 5B:
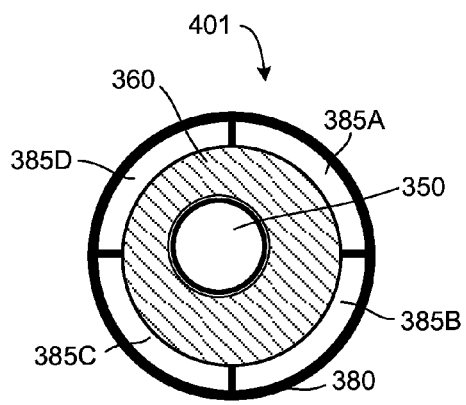
Figure 5C:
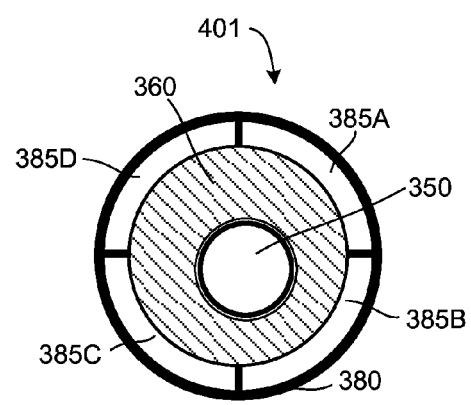

Reference is now made to FIGS. 5A, 5B and 5C showing a simplified schematic cross sectional views cut along a diameter of a writing tip with sensor in accordance with some embodiments of the present disclosure. According to some embodiments of the present disclosure, in a tip pressure sensor 401, electrode 385 is replaced by a plurality of discrete electrodes, e.g. four electrodes 385A, 385B, 385C and 385D. Typically, electrodes 385A, 385B, 385C and 385D are spread in a circumferential direction and electrically isolated from one another. Typically, each of electrodes 385A, 385B, 385C and 385D is electrically connected to circuitry of stylus 200 and output from each of electrodes 385A, 385B, 385C and 385D is detected for monitoring pressure applied on writing tip 350. Optionally, more or less than four electrodes are included in sensor 401. Output from each of the electrodes can be monitored to determine both extent and direction of tilt. For example, in FIG. 5B, writing tip 350 is closest to electrode 385D. Therefore, capacitive coupling between writing tip 350 and electrodes 385D will be higher than the capacitive coupling between writing tip 350 and any of electrodes 385A, 385B and 385C. In addition, the capacitive coupling increases as writing tip 350 approaches electrodes 385D. In FIG. 5C, writing tip 350 is closest to electrode 385B. Therefore, capacitive coupling between writing tip 350 and electrodes 385B will be higher than the capacitive coupling between writing tip 350 and any of electrodes 385A, 385C and 385D. Amplitude of output detected on each of electrodes 385A, 385B, 385C and 385D is typically compared to determine direction of tilt and extent of tilt. Typically, highest amplitude is detected on the electrode that is closest to writing tip 350.

Reference is now made to FIGS. 6A and 6B showing simplified schematic cross sectional views of an exemplary writing tip with resistive based sensor in a neutral position, the cross sectional views cut along a length and diameter respectively in accordance with some embodiments of the present disclosure. In some exemplary embodiments, stylus 200 includes a resistive based sensor 405 in place of sensor 400. Sensor 405 is similar in construction to sensor 400 except that compressible material 361 positioned between tip 350 and electrode 385 is conductive/dielectric material that alters is conductive properties or becomes conductive when compressed. Optionally, composite material of elastic polymer such as silicone rubber mixed with fillers of conductive particles is used. Optionally, material such as QCT™ offered by Peratech Ltd. in the UK is used. Optionally, the material is selected to have hardness in a range of Shore A 20-50. Typically, writing tip 350 and electrode 385 are in physical and electrical contact with compressible material 361. Optionally, compression of material 361 due to tilting or bending of writing tip 350 increases conductivity of material 361 so that a higher amplitude signal is detected on electrode 385. Optionally, the compressible material is selected to have resilient properties so that writing tip 350 is urged back to its neutral position once contact pressure on writing tip is released. In some exemplary embodiments, output from electrode 385 is sampled and processed by circuitry of stylus 200, e.g. by controller 220 (FIG. 2). Optionally, amplitude levels are translated to pressure levels applied on writing tip 350.

Reference is now made to FIG. 7 showing a simplified schematic cross sectional view cut across a diameter of a writing tip and a resistive based sensor in accordance with some embodiments of the present disclosure. According to some embodiments of the present disclosure, resistive based sensor 406 can include a plurality of electrodes 385A, 385B, 385C and 385D spread along a circumferential direction. Typically, plurality of electrodes 385A, 385B, 385C and 385D provide for detecting both extent and direction of tilt or bend of writing tip 350 as discussed herein above in reference to FIGS. 5A, 5B and 5C. Amplitude from one of electrodes 385A, 385B, 385C and 385D closest to writing tip 350 will typically be higher than amplitude from an electrode furthest from writing tip 350.

Figure 8:
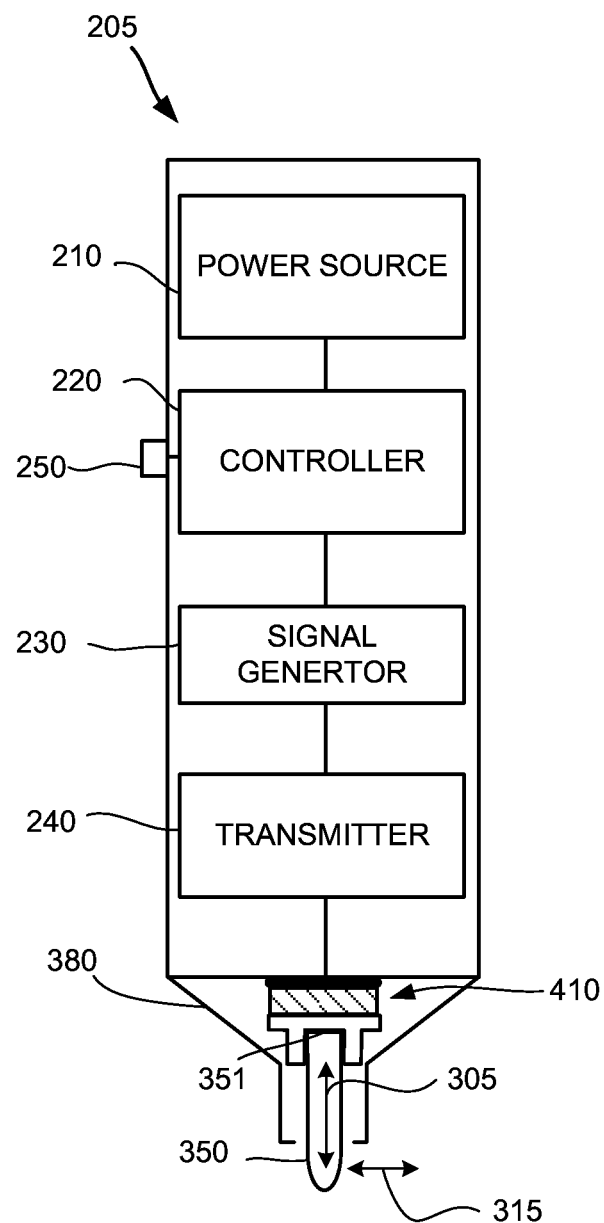
FIG. 8 is a simplified block diagram of an exemplary stylus with an exemplary pressure sensor in communication with a distal end of the writing tip in accordance with some embodiments of the present disclosure.

Reference is now made to FIG. 8 showing a simplified block diagram of an exemplary stylus with an exemplary pressure sensor in communication with a distal end of the writing tip in accordance with some embodiments of the present disclosure.

In some exemplary embodiments, stylus 205 includes a tip pressure sensor 410 that is sensitive to force applied in both axial direction 305 and cross-axial direction 315. Optionally, tip pressure sensor 410 is used in place of sensor 400 and sensor 345 (FIG. 2). In some exemplary embodiments, tip pressure sensor 410 communicates with a distal end 351 of writing tip 350. Stylus 305 may be similar to stylus 200 in that it includes a power source 210, controller 220, signal generator 230, transmitter 240 housed in housing 380. In addition, stylus 205 includes writing tip 350 and user controlled buttons 250 that typically protrude from housing 380.

Figure 9A:
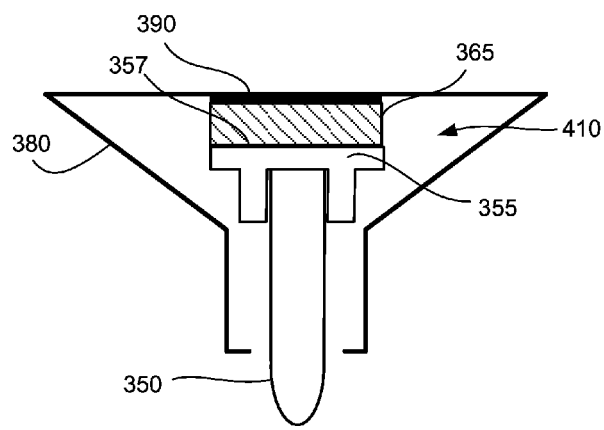
FIGS. 9A, 9B and 9C are simplified schematic cross sectional views cut along a length of the writing tip in accordance with some embodiments of the present disclosure.
Figure 9B:
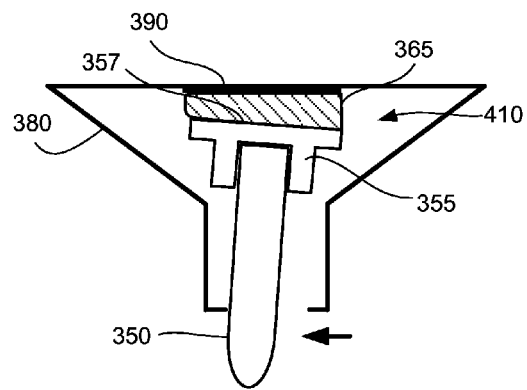
Figure 9C:
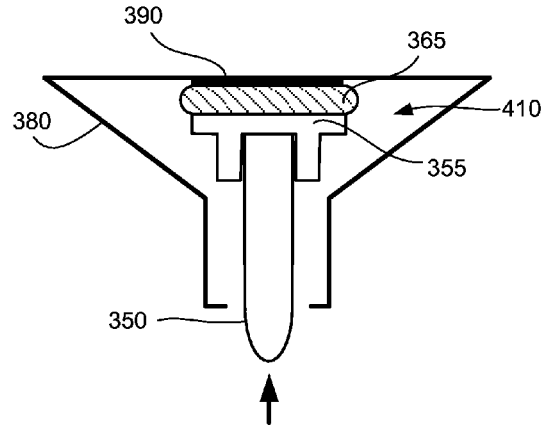

Reference is now made to FIGS. 9A, 9B and 9C are simplified schematic cross sectional views cut along a length of the writing tip in accordance with some embodiments of the present disclosure. According to some embodiments, sensor 410 includes compressible material 365 sandwiched between an electrode 357 patterned or positioned on structure 355 and an electrode 390 fixedly attached to housing 380.

Optionally, compressible material 365 is defined to have a thickness ranging between 100-400 um and is formed from an elastic polymer material such as silicone rubber. Optionally, the material is selected to have hardness in a range of Shore A 20-50. Optionally the diameter of compressible material 365 is selected to range between 4-10 mm. Electrodes 357 and 390 typically extend over surface of compressible material. Typically, each of electrode 357 and electrodes 390 is connected to circuitry of stylus 205, e.g. controller 220. Optionally, structure 355 is a tip holder that holds writing tip 350, tilts in response to bending or tilting of writing tip 350 and retracts in response to axial force applied on writing tip 350. Optionally, structure 355 provides for using an electrode that has a diameter larger than a diameter of writing tip 350.

Optionally, structure 355 is eliminated and conductive material of writing tip 350 is used in place of electrode 357.

Typically, compressible material 365 is selected to have resilient properties.

Optionally, compressible material 365 is a disk shaped element that fills a volume between electrode 357 and electrodes 390. Typically, compressible material 365 compresses both in response to cross-axial force applied on writing tip 350 (FIG. 9B) and axial force applied on writing tip 350 (FIG. 9C). Typically, both cross-axial and axial force is applied on writing tip 350 during contact with a sensing surface.

Sensor 410 may be a capacitive based sensor or a resistive based sensor. For a capacitive based sensor, compressible material 365 is selected to be a dielectric material and output due to capacitive coupling between the electrodes is detected.

Optionally, for a resistive based sensor, compressible material 365 is selected to be a dielectric like material that alters conductivity under compression. For a resistive based sensor, output due conductive properties of compressible material 360 is detected. Typically, for both capacitive and resistive based sensors, output on one of the electrodes 357 and 390 of sensor 410 is detected responsive to input provided to the other electrode. Typically, amplitude of the output is sensitive to proximity between electrodes 357 and 390.

Figure 10:
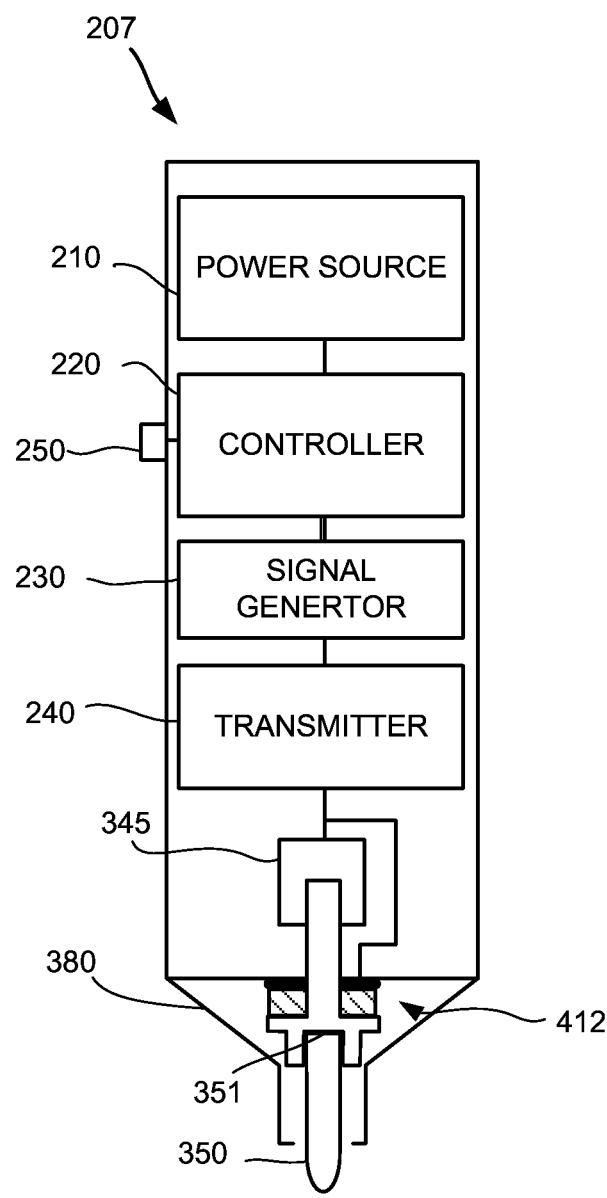
FIG. 10 is a simplified block diagram of an exemplary stylus with an exemplary tip tilt sensor in communication with a distal end of the writing tip in accordance with some embodiments of the present disclosure.
Figure 11:
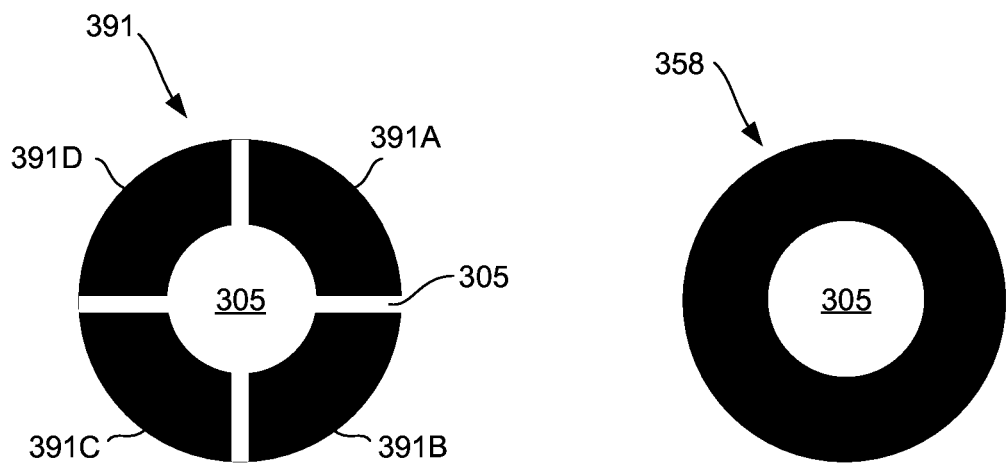
FIG. 11 is a simplified schematic drawing of electrodes for a tip tilt sensor in accordance with some embodiments of the present disclosure.

Reference is now made to FIG. 10 showing a simplified block diagram of an exemplary stylus with an exemplary tilt tip sensor in communication with a distal end of the writing tip and to FIG. 11 showing a simplified schematic drawing of electrodes for tip tilt sensor, both in accordance with some embodiments of the present disclosure. In some exemplary embodiments, stylus 207 includes a tip tilt sensor 412 dedicated to detecting tilt or bend of writing tip 350 that is integrated with pressure sensor 345 dedicated to detecting retraction of writing tip 350 or force exerted in axial direction 305 due to contact pressure. Optionally, tip tilt sensor 412 and 345 detects tilt writing tip 350 at its distal end 351. Stylus 207 may be similar to stylus 200 and stylus 205 in that it includes a power source 210, controller 220, signal generator 230, transmitter 240 housed in housing 380 and includes writing tip 350 and user controlled buttons 250 protruding from housing 380. In some exemplary embodiments, the electrodes making up sensor 412 are adapted to detect both extent and direction of tilt.

Optionally, one electrode of the pair of electrodes making up sensor 410 is divided into a plurality of sections, e.g. 391A, 391B, 391C and 391D and output from each of the sections is detected in response to input provided to the other electrode of the pair, e.g. electrode 358. Typically, each of the plurality of sections is connected to circuitry of stylus 205. Optionally, both electrode 391 and electrode 358 are ring shaped electrodes including non-conductive material in a central area 305. Optionally, only electrode 391 is ring shaped with non-conductive material in central area 305. Sensor 412 can be a capacitive based sensor or a resistive based sensor as described for example in reference to FIGS. 9A, 9B and 9C.

Figure 12:
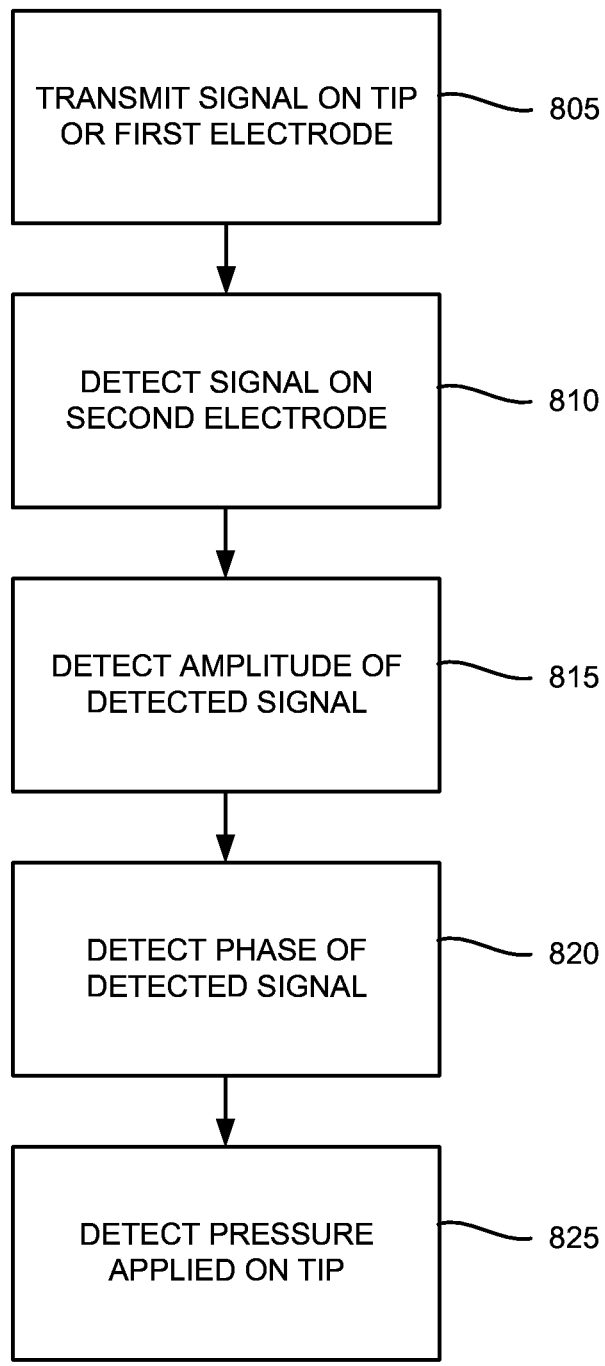
FIG. 12 is simplified flow chart of an exemplary method for sensing cross axial pressure applied on a writing tip in accordance with some embodiments of the present disclosure.

Reference is now made to FIG. 12 showing a simplified flow chart of an exemplary method for sensing cross axial pressure applied on a writing tip in accordance with some embodiments of the present disclosure. According to some embodiments of the present disclosure, a signal is transmitted on writing tip 350 or first electrode 358 (block 805) and detected on electrode 385 or second electrode 391 (block 810). The signal detected is typically sensitive to compression of compressible material, e.g. compressible material 360, 361 and 365 between the electrodes or between tip 350 and electrode 385. For a capacitive sensor, compressible material is selected to have dielectric properties and compression of the material alters the capacitive coupling between the electrodes or between tip 350 and electrode 385. For a resistive sensor, compressible material is selected to have dielectric/conductive properties and conductance of the material changes with compression. Optionally, the material is an electrical insulator that smoothly changes to a conductor when placed under pressure. Optionally, QTC™ offered by Peratech Ltd. in the UK is used as the compressible material for a resistive sensor. The material may be an electrical insulator while in an unstressed state and start to conduct in response to compression.

Typically, amplitude of the detected signal is compared to amplitude of the transmitted signal. Optionally, phase of the detected signal is compared to phase of the transmitted signal. In some exemplary embodiments, pressure applied on the writing tip is detected based on at least one of amplitude and phase of the detected signal as compared to the transmitted signal (block 825).

Figure 13:
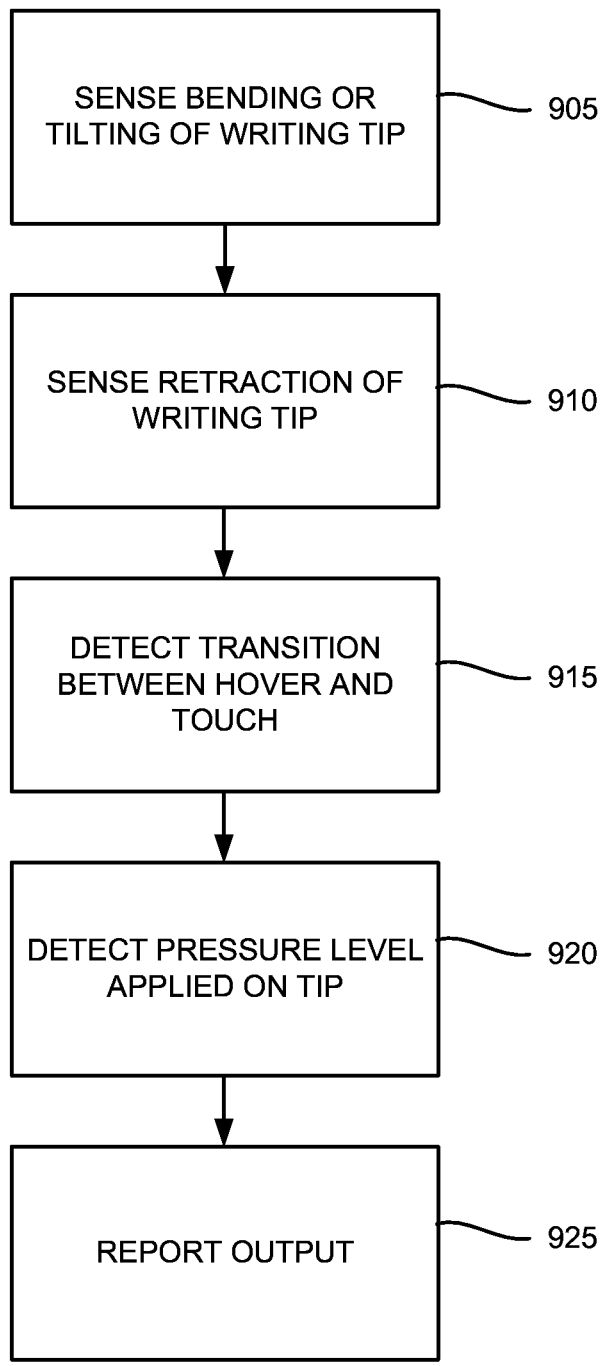
FIG. 13 is simplified flow chart of an exemplary method for sensing contact pressure applied on a writing tip in accordance with some embodiments of the present disclosure.

Reference is now made to FIG. 13 showing a simplified flow chart of an exemplary method for sensing contact pressure applied on a writing tip in accordance with some embodiments of the present disclosure. Bending or tilting of writing tip is detected with a sensor (block 905). Typically, the sensor senses bending or is in response to a cross axial force applied on the tip. The bending or tilting may be detected near an end of the writing tip protruding from the housing of the stylus, e.g. as with sensor 400 and sensor 401 or at a distal end of the writing tip that is maintained in the housing, e.g. as with sensor 410 and sensor 412. Optionally, retraction of the writing tip in response to contact pressure is also detected with a sensor (block 910). Retraction is typically detected with a dedicated sensor, e.g. sensor 345. Optionally, retraction of the writing tip is in response to an axial force applied on the writing. Alternatively, a sensor 410 is sensitive to both cross axial and axial force applied on the writing tip and is used to detect both. Typically, output from a sensor detecting tilting or bending of the writing tip is used to detect a transition between hover and touch (block 915). For example, a transition between hover and touch is detected based on a defined threshold level of tilt or bending. In some exemplary embodiments, transition between hover and touch is detected based on both tilting and retraction of the writing tip. Typically, pressure level applied during touch is also detected based on output from the sensor detecting tilt or bending of the writing tip (block 920). Optionally, pressure level applied during touch is detected based on both tilt and retraction of the writing tip. Typically, output detected is reported to a to digitizer system that the stylus is interacting with by encoding the output to a signal transmitted by the stylus. Optionally, output detected is used to alter operation of the stylus.

An aspect of some embodiments of the present disclosure provides for a stylus comprising: a housing that extends along a longitudinal direction and includes an opening on one end; a tip that extends along the longitudinal direction and through the opening; and a sensor configured to detect displacement of the tip with respect to the housing, wherein the displacement is perpendicular to the longitudinal direction.

Optionally, the sensor is configured to detect bend or tilt of the tip toward the housing.

Optionally, the sensor includes compressible material configured to compress with the displacement of the tip.

Optionally, the compressible material is a ring shaped element fitted including an inner diameter and an outer diameter, wherein the inner diameter is sized to fit around the tip and the outer diameter is sized to contact an electrode fixed to the housing.

Optionally, the electrode is integrated or patterned on the housing.

Optionally, the stylus includes a circuit configured to transmit a first signal via the tip, to detect a second signal on the electrode and to compare at least one of amplitude and phase of the first signal and the second signal.

Optionally, the electrode is divided into a plurality of isolated portions and wherein the circuit is configured to detect a signal on each of the plurality of isolated portions.

Optionally, the compressible material is sandwiched between a first electrode fixed to the tip and a second electrode fixed to the housing.

Optionally, the stylus includes a circuit configured to transmit a first signal via the tip, to detect a second signal on the second electrode and to compare at least one of amplitude and phase of the first signal and the second signal.

Optionally, the second electrode is divided into a plurality of isolated portions and wherein the circuit is configured to detect the second signal on each of the plurality of isolated portions.

Optionally, the compressible material is resilient.

Optionally, the compressible material is a dielectric material.

Optionally, the compressible material is configured to vary its conductive properties in response to compression.

Optionally, the material is configured to switch between being electrically non-conductive and electrically conductive based on compression.

Optionally, the sensor is a capacitive sensor.

Optionally, the sensor is a resistive sensor.

Optionally, the sensor is configured to detect a transition between hover operational state and a touch operation state of the stylus.

Optionally, the sensor is configured to detect different pressure levels applied on the tip during operation of the stylus.

Optionally, the stylus includes a second sensor communicating with the tip, wherein the second sensor is configured to detect force applied on the tip in the longitudinal direction.

Optionally, the stylus includes a signal generator for generating a signal to be transmitted by the stylus; a transmitter for transmitting the signal generated by the signal generator; and a controller for controlling operation of the stylus.

Optionally, output from the sensor is encoded in the signal transmitted by the transmitter.

An aspect of some embodiments of the present disclosure provides for a method comprising: detecting bending or tilting of a tip with respect to a housing of a stylus, wherein the tip protrudes from the housing of the stylus; and detecting transition between a hover operational state and a touch operation state of the stylus based on the detected bending or tilting.

Optionally, the method includes detecting retraction of the tip with respect to the housing; and detecting transition between a hover operational state and a touch operation state of the stylus based the detected retraction.

Optionally, the method includes detecting variations in pressure applied on the tip based on the detected bending or tilting.

Optionally, the method includes transmitting a signal with the stylus, wherein the detected bending or tilting is encoded in the signal.

Certain features of the examples described herein, which are, for clarity, described in the context of separate embodiments, may also be provided in to combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A stylus comprising:
   a housing that extends along a longitudinal direction and includes an opening on one end;
   a tip that extends along the longitudinal direction and through the opening; and
   a sensor configured to detect displacement of the tip with respect to the housing, wherein the displacement is perpendicular to the longitudinal direction, wherein the sensor includes compressible material configured to compress with the displacement of the tip and wherein the compressible material is configured to vary its level of conductivity in response to the compression.

2. The stylus according to claim 1, wherein the sensor is configured to detect bend or tilt of the tip toward the housing.

3. The stylus of claim 1, wherein the compressible material is a ring shaped element fitted including an inner diameter and an outer diameter, wherein the inner diameter is sized to fit around the tip and the outer diameter is sized to contact an electrode fixed to the housing.

4. The stylus according to claim 3, wherein the electrode is integrated or patterned on the housing.

5. The stylus according to claim 4, comprising a circuit configured to transmit a first signal via the tip, to detect a second signal on the electrode and to compare at least one of amplitude and phase of the first signal and the second signal.

6. The stylus according to claim 5, wherein the electrode is divided into a plurality of isolated portions and wherein the circuit is configured to detect a signal on each of the plurality of isolated portions.

7. The stylus according to claim 1, wherein the compressible material is sandwiched between a first electrode fixed to the tip and a second electrode fixed to the housing.

8. The stylus according to claim 7, comprising a circuit configured to transmit a first signal via the tip, to detect a second signal on the second electrode and to compare at least one of amplitude and phase of the first signal and the second signal.

9. The stylus according to claim 8, wherein the second electrode is divided into a plurality of isolated portions and wherein the circuit is configured to detect the second signal on each of the plurality of isolated portions.

10. The stylus according to claim 1, wherein the compressible material is resilient.

11. The stylus according to claim 1, wherein the compressible material is a dielectric material.

12. The stylus according to claim 1, wherein the material is configured to switch between being electrically non-conductive and electrically conductive based on compression.

13. The stylus according to claim 1, wherein the sensor is a capacitive sensor.

14. The stylus according to claim 1, wherein the sensor is a resistive sensor.

15. The stylus according to claim 1, wherein the sensor is configured to detect a transition between hover operational state and a touch operation state of the stylus.

16. The stylus according to claim 1, wherein the sensor is configured to detect different pressure levels applied on the tip during operation of the stylus.

17. The stylus according to claim 1 comprising a second sensor communicating with the tip, wherein the second sensor is configured to detect force applied on the tip in the longitudinal direction.

18. The stylus according to claim 1 comprising:
a signal generator for generating a signal to be transmitted by the stylus;
a transmitter for transmitting the signal generated by the signal generator; and
a controller for controlling operation of the stylus.

19. The stylus according to claim 17, wherein output from the sensor is encoded in the signal transmitted by the transmitter.

20. The stylus according to claim 1, wherein the compressible material is an elastic polymer mixed with conductive particles.

21. The stylus according to claim 1, wherein the compressible material is configured to smoothly change from an electrical insulator under no pressure to a conductor when placed under pressure.

22. The stylus according to claim 1, wherein the compressible material is defined to have a thickness ranging between 100-400 µm and a hardness in a range of Shore A 20-50.

* * * * *